June 1, 1965 G. E. MELINK 3,186,898

LAMINATED CIRCUIT STRUCTURE AND METHOD OF PREPARING SAME

Filed June 15, 1961

INVENTOR.
GEORGE E. MELINK
BY Orrin M. Haugen
ATTORNEY

United States Patent Office 3,186,898 Patented June 1, 1965

3,186,898
LAMINATED CIRCUIT STRUCTURE AND METHOD OF PREPARING SAME

George E. Melink, Brooklyn Center, Minn., assignor to Sperry Rand Corporation, New York, N.Y., a corporation of Delaware Filed June 15, 1961, Ser. No. 117,354
6 Claims. (Cl. 161—214)

The present application relates generally to an improved laminated electrical circuit structure, and more particularly to a certain thin, rigid, laminated circuit, structure which is particularly adapted for use in combination with magnetic memory devices and the like.

In the preparation of magnetic memory arrays, a plurality of superposed layers of electrical conductor elements are required for each individual memory unit in the array. For example, separate conductive means must be provided for individual operations, including means for writing into the element, reading, and sensing the immediate remanent condition thereof. For purposes of reliability and dependability of operation, it is desirable to fabricate the circuit structure as thin as is possible, consistent with the requirements of rigidity. In this connection, thin circuitry is advantageous from the standpoint of obtaining signals having greater intensity from a given magnetic film core than would be obtainable from heavier circuitry. The core is correspondingly capable of use with lower drive currents. Stated another way, the thin cross section provides a lower reluctance path for the flux generated from the driving current as well as for the signal flux generated in the magnetic memory element. Magnetic memory core systems generally employ an arrangement wherein the cores are desirably placed in superposed relationship on either side of the printed circuitry, and the thin cross section is obviously advantageous for enhancing magnetic interaction between the oppositely disposed magnetic cores. When cooperating cores are being utilized on either side of a printed wiring array, the wiring is most advantageously utilized as a support for the magnetic memory elements. Thus, the rigidity of the wiring laminate must be sufficient to maintain proper relative relationship between the individual magnetic memory elements.

Referring to the cross sectional dimension of the conductors, it is imperative that the conductor be thinner than the skin depth of the field at the operating frequency being utilized. The skin depth for copper may be computed from the formula:

$$D_s=\frac{2.6}{\sqrt{f}}$$

wherein $D_s$ is the skin depth in mils and $f$ is the signal frequency in megacycles. For operation at frequencies in the range of 100 megacycles the conductors interposed between cooperating cores must have a thickness which is less than about ½ mil in order to avoid substantial signal attenuation.

In accordance with the present invention, an extremely thin, highly rigid printed circuitry arrangement is provided, the arrangement including a first laminate structure comprising a pair of conductors arranged on oppositely disposed sides of a film forming adhesive layer, and at least one second laminate structure comprising a conductive layer secured to one surface of a pre-stressed or molecularly oriented film. The adhesive layer is preferably soluble in certain solvents, in order that with proper dimensional relationships given between the two laminae, the layer of circutiry on the underside thereof may be readily exposed in order to facilitate attachment of appropriate terminal leads thereto. The adhesive utilized between the laminae must be compatible with the pre-stressed film utilized both chemically and in its dimensional response, and additionally must possess good electrical properties. In addition, the dimensional responses of the adhesive and the pre-stressed film must be closely matched in order to preserve the physical form of the assembly. It has been found that a polyester film stressed upon curing so as to provide molecular orientation, such as stressed ethylene terephthalate, is ideally suited for the film material, while an adhesive consisting essentially of ethylene terephthalate is preferably utilized in combination with this film.

Therefore, it is an object of the present invention to provide an extremely thin, highly rigid laminated circuitry structure having alternate layers of conductors and insulators, one insulator layer comprising a pre-stressed, molecularly oriented film, another insulating layer comprising a substantially compatible adhesive layer having dimensionally responsive characteristics which are closely related to those of the pre-stressed film.

It is a further object of the present invention to provide a thin, rigid multi-layer circuitry assembly which possesses a high degree of dimensional stability under varying ambient conditions.

It is yet a further object of the present invention to provide an improved multi-layer circuitry arrangement which is thin and rigid, and which provides ready accessibility to lead terminals, and which is particularly adapted for use in connection with magnetic memory core assemblies.

It is yet another object of the present invention to provide an improved multi-layer circuitry arrangement which is particularly adapted for use in connection with magnetic cores disposed on either side thereof.

Other and further objects of the present invention will become apparent to those skilled in the art upon a study of the following specification, appended claims and accompanying drawings wherein:

Figure 1:
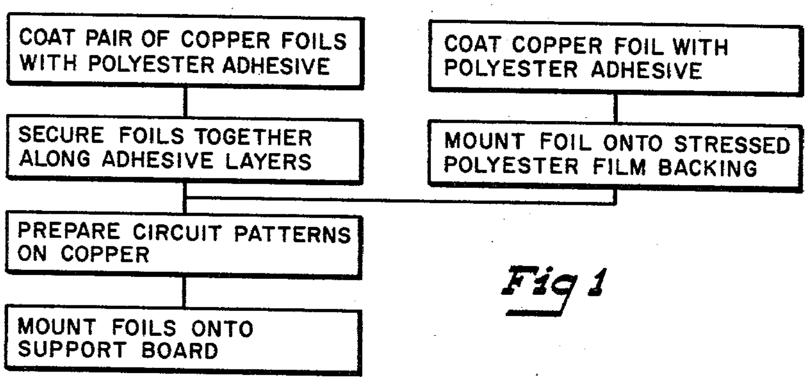
FIG. 1 is a flow chart illustrating a preferred fabrication technique which may be employed in accordance with the present invention.
Figure 2:
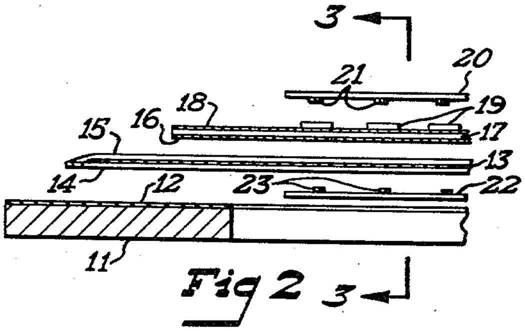
FIG. 2 is an exploded partial vertical sectional view taken along the line and in the direction of the arrows 2—2 of FIG. 3 and illustrating one end of a circuitry array in accordance with the present invention, both ends being identical.
Figure 3:
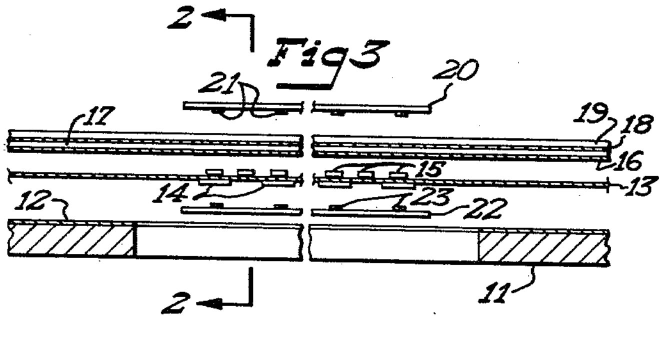
FIG. 3 is a view similar to FIG. 2 taken along the line and in the direction of the arrows 3—3 of FIG. 2.

In accordance with the preferred modification of the present invention as shown in FIGS. 2 and 3 of the accompanying drawings, the printed circuitry assembly generally designated 10 includes a base or edge frame member 11, the base preferably being fabricated from a dimensionally stable material which has desirable electrical properties such as, for example, fiberglass impregnated with a thermosetting resin material such as an epoxy base resin or the like. An adhesive layer 12 along the top surface of the base 11 is provided to secure the insulator layer 13 to the base 11. The layer 13 is provided with a pair of oppositely disposed conductors 14—14 and 15—15. Insulator layer 13 together with conductors 14—14 and 15—15 form a first laminate assembly. Superposed over the first laminate structure is the pre-stressed or molecularly oriented film member 17, an adhesive layer 16 being utilized to join the surfaces of the films 13 and 17. Conductors 19—19 are disposed along the top surface of the film member 17 and accordingly provide a third layer of circuitry for the circuitry assembly, adhesive film 18 being utilized to mount conductor 19—19 to the film 17. Insulating film 17 and conductors 19—19 form a second laminate assembly. A pair of magnetic core assemblies are disposed in operative relationship with the circuitry arrangement, each magnetic core arrangement including a glass or other suitable substrate base such as the substrates 20 and 22, each substrate having a plurality of magnetic cores such as the cores 21—21 and 23—23 disposed along one surface thereof. The cores are, of course, arranged along the surface adjacent the printed circuitry.

In order to prepare the assembly shown in FIGS. 2 and 3, a film of copper such as, for example, 0.5 mil copper is coated with a certain polyester adhesive. This adhesive is dimensionally compatible with the pre-stressed molecularly oriented film utilized in the assembly. When pre-stressed ethylene terephthalate is utilized for the film 17, the adhesive preferably has ethylene terephthalate as the major adhesive constituent thereof. While other materials could be successfully utilized, this particular combination has been found unusually useful. Polyester adhesives utilizing ethylene terephthalate as the major constituent are commercially available, such as that certain polyester adhesive marketed by E. I. du Pont de Nemours and Company, Inc. of Wilmington, Delaware under their code number DuPont 46,971. For purposes of preparing a uniform coating on the copper, a drawdown bar, knife coater or the like may be utilized. The second copper sheet is placed over the adhesive coating on the first sheet, and any entrapped air or gas bubbles are excluded from between the copper plates. The assembly may be placed in a vacuum laminator until the entrained or entrapped air or other gases are removed from between the layers of copper. The laminate is then dipped in photo-resist, dried, exposed or printed, and finally developed and etched. After etching, the assembly is washed, rinsed and dried. Photo-etching techniques utilized here are well known in the art, and the material so prepared does not require any unusual treatment.

The second laminate is fabricated in accordance with the following procedure. A copper film having a thickness of ½ mil is initially coated with the polyester adhesive such as set forth hereinabove. A film of pre-stressed molecularly oriented ethylene terephthalate is then smoothed out onto a flat surface, care being taken to exclude air entrapped between the surface and the film. Pre-stressed molecularly oriented ethylene terephthalate is commercially available under the code name Mylar, this material being available from E. I. du Pont de Nemours and Company, Inc. of Wilmington, Delaware. After bringing the surface of the film and the copper into contact, air is excluded from between the sheets, such as by rolling or other similar operations. The second laminate is then ready to be coated with a suitable photo-resist, and is then exposed, developed and etched. Again the photo-resist techniques used are well known in the art and no unusual problems are created. The second laminate structure is then ready for mounting. If desired, a second layer of copper conductor may be applied to the opposite surface of the second laminate structure.

One surface of the circuit board or frame is coated with a suitable polyester adhesive, the adhesive then being dried and arranged for reactivation. A suitable polyester adhesive such as ethylene terephthalate is preferably utilized. When the board is needed, the adhesive is activated and made tacky by exposure to trichloroethylene vapors. While the adhesive is tacky, the first laminate layer is placed on the board and rolled down thereon to eliminate any wrinkles, folds and the like. The exposed surface of the pre-stressed, molecularly oriented film is then coated with a suitable compatible adhesive, preferably ethylene terephthalate. This adhesive layer is then permitted to dry, and is subsequently activated as required. The laminate with the adhesive activated, is then positioned over the first laminate and rolled down firmly thereon. The edge surfaces of the second laminate are arranged so that the film does not cover the terminals or end portions of the conductors on the first laminate.

In order to completely set the adhesive and bond the assembly, the array is placed in a heat treating chamber and mechanical pressure is utilized to retain the laminae in proper relative position. The temperature is then elevated to a sufficient level for a period sufficiently long to accomplish setting of the adhesive. For ethylene terephthalate, a temperature of 230° F. for a period of about 30 minutes is adequate to accomplish setting or curing. Since the adhesive layer utilized in the first lamina is soluble in a solvent such as trichloroethylene, the terminal tips situated along the bottom surface are readily accessible after the adhesive is dissolved away. The term "soluble" is intended to encompass not only the ordinary sense of the term wherein the material actually dissolves in a solvent, but also wherein the material is softened by the solvent and physically abraded away. This activity may be most conveniently carried out immediately prior to curing.

The assembly is then ready for use, and the magnetic core memory members may be mounted thereon in oppositely disposed relationship, as shown in FIGS. 2 and 3.

In a typical circuitry structure, 0.5 mil copper is used together with a pre-stressed film of ethylene terephthalate having a thickness of 0.25 mils. Three layers of circuitry may be fabricated from this arrangement wherein the overall thickness is in the range of 2 mils. The rigidity of this system is substantially greater than that which may be achieved with a pair of laminates having identical insulator layers, such as two pre-stressed layers of ethylene terephthalate adhesively secured together or two cured in situ adhesive layers of the same adhesively secured together.

It would be appreciated that various modifications in the technique as set forth hereinabove may be made without departing from the spirit and scope of the present invention, and that the examples given herein are for purposes of illustration, and are not to be otherwise construed as a limitation upon the claims herein.

What is claimed is:

1. Laminated conductor means comprising a plurality of alternate conductors and insulators arranged in stacked relationship, said insulators including a first film and at least one second film, said first film comprising a polyester adhesive having a first and a second conducting layer secured to opposite surfaces thereof and forming a first laminate structure, each of said second films comprising a prestressed polyester film having an additional conductor layer arranged along at least one major surface thereof and forming a second laminate structure, said first and said second laminate structures being adhesively secured together with a polyester adhesive composition and being arranged in superimposed laminated relationship.

2. The method of preparing laminated conductor structures which comprises coating a first conductive film with a first layer of polyester adhesive and securing a second conductive film to said first adhesive layer to form a first lamina, securing at least one additional conductive film to a prestressed polyester film to form a second lamina, and thence securing said first and said second laminae together with a compatible polyester adhesive to form a unitary circuit structure.

3. The method of preparing substantially planar laminated conductor structures which comprises coating a first conductive film with a first layer of a rigid soluble adhesive, securing a second conductive film to said first adhesive layer to form a first lamina having a certain first predetermined length dimension, securing an additional conductive film to the top surface of a prestressed polyester film having a length dimension which is less than said first predetermined length to form a second lamina, superimposing said second lamina onto said first lamina along the bottom surface of said polyester film to form a unitary circuit structure, mounting said circuit structure onto a rigid frame member, and dissolving the edge portions of said soluble adhesive to expose said first conductor.

4. The method of preparing substantially planar laminated conductor structures which comprises coating a first conductive film with a first layer of a rigid soluble adhesive, securing a second conductive film to said first adhesive layer to form a first lamina having a certain first predetermined length dimension, securing additional conductive films to the top surface of a series of prestressed polyester films, each succeeding additional conductive films and prestressed polyester films having a progressively diminishing length dimension, each being less than said first predetermined length dimension to form a series of lamina, superimposing said additional lamina onto said first lamina to form a unitary circuit structure with intervening insulators layers, each having a progressively diminishing length dimension, mounting said circuit structure onto a rigid frame member along said first conductive film surface, and dissolving the edge portions of said soluble adhesive to expose said first conductive film.

5. The method as set forth in claim 4 being particularly characterized in that said polyester is ethylene terephthalate.

6. The method of preparing substantially laminated insulated conductor structures which comprises coating a first conductive film with a first layer of a rigid soluble adhesive, securing a second conductive film to said first adhesive layer to form a first lamina having a certain first predetermined length dimension and a certain first predetermined width dimension, securing an additional conductive film to the top surface of a prestressed polyester film having length and width dimensions which are less than said first predetermined length and width dimensions to form a second lamina, superimposing said additional lamina onto said first lamina to form a unitary circuit structure with a progressively diminishing length and width dimensions, mounting said circuit structure onto a rigid frame member along said first conductive film surface, and dissolving the edge portions of said soluble adhesive to expose said first conductor.

References Cited by the Examiner

UNITED STATES PATENTS

| | | | |
|---|---|---|---|
| 2,736,677 | 2/56 | Eisler | 317—101 |
| 2,876,393 | 3/59 | Tally et al. | 174—137 |
| 3,013,914 | 12/61 | Willard | 138—164 |

FOREIGN PATENTS

| | | |
|---|---|---|
| 161,646 | 6/55 | Australia. |

EARL M. BERGERT, *Primary Examiner.*